US009919264B2

(12) United States Patent
Shin et al.

(10) Patent No.: US 9,919,264 B2
(45) Date of Patent: Mar. 20, 2018

(54) ENHANCED GRAPHENE OXIDE MEMBRANES AND METHODS FOR MAKING SAME

(71) Applicant: BATTELLE MEMORIAL INSTITUTE, Richland, WA (US)

(72) Inventors: Yongsoon Shin, Richland, WA (US); David W. Gotthold, Richland, WA (US); Leonard S. Fifield, Richland, WA (US); Wei Liu, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 113 days.

(21) Appl. No.: 15/187,305

(22) Filed: Jun. 20, 2016

(65) Prior Publication Data

US 2017/0036172 A1 Feb. 9, 2017

Related U.S. Application Data

(60) Provisional application No. 62/201,478, filed on Aug. 5, 2015.

(51) Int. Cl.

| | |
|---|---|
| ***B01D 53/22*** | (2006.01) |
| ***B01D 67/00*** | (2006.01) |
| ***B01D 69/02*** | (2006.01) |
| ***B01D 71/02*** | (2006.01) |
| *B01D 53/26* | (2006.01) |

(52) U.S. Cl.

CPC ....... *B01D 53/228* (2013.01); *B01D 67/0048* (2013.01); *B01D 67/0093* (2013.01); *B01D 69/02* (2013.01); *B01D 71/021* (2013.01); *B01D 53/268* (2013.01); *B01D 2323/48* (2013.01); *B01D 2325/04* (2013.01)

(58) Field of Classification Search

CPC ................ B01D 69/02; B01D 2325/04; B01D 67/0093; B01D 53/228; B01D 67/0048; B01D 53/268; B01D 2323/48; B01D 71/021

See application file for complete search history.

(56) References Cited

U.S. PATENT DOCUMENTS

2012/0107593 A1* 5/2012 Luo ....................... C01B 31/043 428/220
2013/0305927 A1* 11/2013 Choi .................... B01D 71/021 96/13
2014/0069277 A1* 3/2014 Choi .................... B01D 53/228 96/13
2014/0230653 A1 8/2014 Yu et al.
2014/0311967 A1* 10/2014 Grossman ............ C01B 32/184 210/500.21
2014/0318373 A1* 10/2014 Wood ..................... B01D 71/06 96/11

(Continued)

OTHER PUBLICATIONS

Cruz-Silva, R., et al., Super-stretchable Graphene Oxide Macroscopic Fibers with Outstanding Knotability Fabricated by Dry Film Scrolling, ACS Nano, 8, 6, 2014, 5959-5967.

(Continued)

*Primary Examiner* — Anthony Shumate
(74) *Attorney, Agent, or Firm* — Derek H. Maughan

(57) ABSTRACT

A method for making a graphene oxide membrane and a resulting free-standing graphene oxide membrane that provides desired qualities of water permeability and selectivity at larger sizes, thinner cross sections, and with increased ruggedness as compared to existing membranes and processes.

10 Claims, 9 Drawing Sheets

100
GRAPHITE d = 3.34Å (2θ = 26.7°)
2
OXIDATION (1) WITH [9:1] H2SO4/H3PO4 ACID SOLN
102
COOH OH GRAPHITE OXIDE (GOx) d = 7.1 - 8.8Å (2θ = 10.2 - 12.5°)
OXIDATION (2) WITH KMnO4 POWDER
104
GRAPHENE OXIDE (GO) SLURRY
106
NEUTRALIZE GO SLURRY (E.G. W/ H2O2/H2O SOLUTION)
NEUTRAL GO SLURRY
ACIDIFY TO REMOVE METAL IONS (E.G., W/ 1M H2SO4 OR HCL)
108 110
WASH TO NEUTRAL PH
112
CENTRIFUGE (1) 4000 RPM TO REMOVE SMALL FLAKES FROM SLURRY
114
CENTRIFUGE (2) 9000 RPM TO REMOVE EXCESS WATER
CONCENTRATED GO DISPERSION (1-3 WT%) WITH GO FLAKES > 100 μm
CAST ON RECEIVING SURFACE
116 118
REMOVE MEMBRANE FROM RECEIVING SURFACE
GO MEMBRANE (FREE-STANDING) WITH GO FLAKES > 100 μm

SCHEMATIC SHOWING METHOD OF MAKING

(56) References Cited

U.S. PATENT DOCUMENTS

| | | | | |
|---|---|---|---|---|
| 2015/0318531 | A1* | 11/2015 | Kung | H01M 10/4235 429/145 |
| 2016/0023167 | A1* | 1/2016 | Deemer | C02F 1/44 210/650 |
| 2016/0074814 | A1* | 3/2016 | Park | B01D 69/12 210/500.33 |
| 2016/0214069 | A1* | 7/2016 | Ding | B01D 69/02 |
| 2016/0280563 | A1* | 9/2016 | Raveendran-Nair | B01D 71/021 |
| 2017/0144107 | A1* | 5/2017 | Garaj | B01D 71/021 |
| 2017/0326505 | A1* | 11/2017 | Deemer | B01D 71/021 |

OTHER PUBLICATIONS

Hummers, W. S. Jr., et al., Preparation of Graphitic Oxide, J. Am. Chem. Soc., 80, 6, 1958, 1339.

Lerf, A., et al., Hydration behavior and dynamics of water molecules in graphite oxide, Journal of Physics and Chemistry of Solids, 67, 2006, 1106-1110.

Marcano, D. C., et al., Improved Synthesis of Graphene Oxide, ACS Nano, 4, 8, 2010, 4806-4814.

Nair, R. R., et al., Unimpeded Permeation of Water Through Helium-Leak-Tight Graphene-Based Membranes, Science, 335, 2012, 442-444.

Song, J., et al., Preparation and Characterization of Graphene Oxide, Journal of Nanomaterials, 2014, 1-6.

Zhao, J., et al., Efficient Preparation of Large-Area Graphene Oxide Sheets for Transparent Conductive Films, ACS Nano, 4, 9, 2010, 5245-5252.

* cited by examiner

SCHEMATIC SHOWING METHOD OF MAKING 2.0 μm THICKNESS 1.0 μm THICKNESS

TABLE 1

| GO MEMBRANE | D-SPACING (1) (Å) | AVE FLAKE SIZE (μm) | C/O RATIO (2) (%) | C1S (%) (3) | | | | THICKNESS (μm) |
|---|---|---|---|---|---|---|---|---|
| | | | | C=C | C-O | C=O | C(O)-O | |
| 1 | 8.19 | 20-30 | 54.6/45.4 | 29.7 | 56.8 | 9.0 | 3.8 | 4 |
| 2 | 7.91 | 20-40 | 54.6/45.4 | 26.3 | 62.4 | 8.8 | 2.4 | 6 |
| 3 | 8.22 | 100 | 54.6/45.4 | 26.7 | 62.3 | 9.1 | 1.8 | 3 |
| 4 | 7.62 | 2-10 | 67.7/32.4 | 38.0 | 52.0 | 5.2 | 4.0 | 10 |
| 5 | 7.39 | 0.5-5 | 66.3/33.9 | 39.6 | 48.4 | 5.5 | 5.8 | 5 |

SAMPLE 1. CAST (ALDRICH)
SAMPLE 2. CAST
SAMPLE 3. CAST (ASBURY)
SAMPLE 4. BC-VF
SAMPLE 5. SKU-HCGO-W-60-VF (1) XRD RESULT
(2) XPS RESULT
(3) XPS RESULT

COMPARISON OF PHYSICAL PROPERTIES OF GO MEMBRANES

FIG. 3

TABLE 2.

TEST RESULTS

| GO MEMBRANE | FLAKE SIZE (μm) | THICKNESS (μm) | $H_2O$ PERMEANCE ($mol/m^2.s.Pa$) | SELECTIVITY ($H_2O/N_2$) |
|---|---|---|---|---|
| **1** | **20-100** | **4** | **$1.0 \times 10^{-5}$** | **$10^{4}$*** |
| **3** | **100** | **3** | **$7.6 \times 10^{-6}$** | **$10^{4}$*** |
| 4 | 2-10 | 10 | $9.4 \times 10^{-7}$ | $10^{4}$* |
| | | 50 | $1.2 \times 10^{-6}$ | $10^{4}$* |
| 5 | 0.5-5 | 5 | $2.3 \times 10^{-6}$ | $10^{4}$* |

*ABOVE SYSTEM LIMIT OF $10^4$

FIG. 7

TABLE 3.

| MEMBRANE MATERIAL | WATER VAPOR PERMEABILITY (BARRER) | WATER VAPOR PERMEANCE (mol/m$^2$.s.Pa) | $H_2O/N_2$ SELECTIVITY |
|---|---|---|---|
| SULFONATED POLY(ETHER ETHER KETONE) (SPEEK) | $7.00 \times 10^4$ | $4.60 \times 10^{-7}$ | $1.0 \times 10^{7*}$ |
| PEBAX® 1074 | $1.60 \times 10^5$ | $2.87 \times 10^{-6}$ | $2.0 \times 10^{5*}$ |
| IONIC LIQUID [EMIM] [Tf2N] | $2.83 \times 10^5$ | $2.10 \times 10^{-7}$ | 3843* |
| STABILIZED LIQUID POLY ETHYLENE GLYCOL | $1.50 \times 10^4$ | $7.50 \times 10^{-7}$ | 2000* |
| NaA/Ni | $6.09 \times 10^4$ | $6.8 \times 10^{-76}$ | 178 |
| GRAPHENE OXIDE | **$2.3 \times 10^5$** | **$1.01 \times 10^{-5}$** | **$>10^4$** |

*SELECTIVITY WAS CALCULATED AS A RATIO OF RELATIVE PERMEABILITY OF SINGLE GAS.

COMPARISON OF MEMBRANE PERFORMANCE

FIG. 8

ENHANCED GRAPHENE OXIDE MEMBRANES AND METHODS FOR MAKING SAME

CROSS REFERENCE TO RELATED APPLICATION

This is a non-provisional application that claims priority from U.S. provisional application No. 62/201,478 filed 5 Aug. 2015, which is incorporated in its entirety herein.

STATEMENT REGARDING RIGHTS TO INVENTION MADE UNDER FEDERALLY-SPONSORED RESEARCH AND DEVELOPMENT

This invention was made with Government support Contract DE-ACO5-76RL01830 awarded by the U.S. Department of Energy. The Government has certain rights in the invention.

BACKGROUND OF THE INVENTION

Dehumidification is widely used, for example, for building air-conditioning systems, for controlling humidity, for dehydration of natural gas, and for moisture regulation in protective apparel. Several dehumidification technologies for controlling temperature and humidity in buildings have been reported in the literature including electro-osmotic dehumidification, solid adsorbents, and liquid desiccants. However, these technologies are capitally intensive, and provide no improvement in energy consumption to promote their adoption. Semi-permeable membranes constructed of various polymer materials have also been used to remove water vapor from humid air streams. Water vapor permeability and $H_2O/N_2$ selectivity properties of these membranes depend on the materials used in these membranes. For example, separation membranes made from polyether block amides (e.g., PEBAX®-1074) or sulfonated poly (ether ether ketone) (SPEEK) perform reasonably well in humid environments. However, polymer separation membranes are still energy intensive in operation.

More recently, graphene oxide (GO) membranes have attracted attention because small-scale membranes prepared via vacuum filtration have shown promise. However, a variety of problems still exist. Typically set-up options for such arrangements are limited and resulting membranes are generally small. More recently, larger GO membranes have been reported in the literature prepared from dilute GO dispersions from graphite powders, which are cast onto a PTFE plate to produce the GO membranes. However, a remaining problem for conventional GO membranes is their small GO flake diameter (<5 micrometers) that cause membranes made from these flakes to be structurally instable and to fracture easily. Thus, conventional GO membranes must be supported in operation. Accordingly, new methods are needed for making GO membranes with sizes that are easily scaled, are strong and pliable, have GO flakes that are structural stable, and further provide a high water selectivity and a superior water vapor permeability compared, e.g., to $N_2$ gas, for dehumidification applications. The present invention addresses these needs.

SUMMARY OF THE INVENTION

The present invention is a method for making a graphene oxide membrane, and a resulting freestanding graphene oxide membrane that provides the desired qualities of water permeability and selection at larger sizes, thinner cross sections and with increased ruggedness as compared to existing membranes and processes. In one embodiment of the invention the membrane is made by casting a gel dispersion of graphene oxide (GO) flakes having an average diameter greater than or equal to about 100 micrometers at a substantially neutral pH onto a receiving surface. The gel dispersion is then permitted to air dry on the receiving surface to form the membrane. Once dry the membrane can be removed from the surface and used. In one example the gel dispersion has a pH between about 5 to about 7.5 and a concentration of graphene oxide flakes between about 1% to about 3% by weight. In one embodiment a freestanding graphene oxide membrane with a thickness between 1 to 10 micrometers, has a selectivity for H2O in a mixed gas greater than $10^5$, and a permeability for $H_2O$ of at least ~10-5 mol/m2·s·Pa, and the membrane has graphene oxide (GO) flakes with an average diameter greater than or equal to about 100 micrometers.

In one example the gel dispersion is formed by a process including placing a graphite solid with a particle size greater than about 150 micrometers into a concentrated acid solution without sonicating or stirring the graphite for a time sufficient to form a quantity of graphite oxide. $KMnO_4$ powder is then added to the concentrated acid solution to form individual layers of graphene oxide (GO) therein. Once formed, the individual layers of graphene oxide (GO) are placed in a $H_2O_2/H_2O$ solution to neutralize the unreacted $KMnO_4$. The individual layers of graphene oxide (GO) are then washed in a neutral solution without stirring or rotating the graphene oxide (GO) and acidifying the neutral solution to remove reduced metal as metal ions. By iteratively rinsing and centrifuging the individual layers of graphene oxide (GO) in the previously acidified solution with distilled $H_2O$ a solution with a pH between about 5 and about 7.5 is obtained and graphene oxide (GO) flakes of a diameter less than about 5 micrometers can be removed. Once cast on to the support surface a draw bar can be used to draw the dispersion down to the selected thickness.

Various advantages and novel features of the present invention are described herein and will become readily apparent to those of ordinary skill in the art from the descriptions and demonstrations set forth herein. As will be realized, the invention is capable of modification in various respects without departing from the spirit and scope of the present invention. Accordingly, the following drawings and descriptions of the present invention should be seen as illustrative of the invention and not as limiting in any way.

BRIEF DESCRIPTION OF THE DRAWINGS

FIG. 3 is a table comparing physical properties of exemplary GO membranes of the present invention against conventional GO membranes.

FIG. 7 is a table comparing permeability test results for exemplary GO membranes of the present invention against conventional GO membranes.

FIG. 8 is a table comparing permeability test results for exemplary GO membranes of the present invention against conventional permeation membranes.

DETAILED DESCRIPTION

The following description includes a preferred embodiment of the present disclosure. It will be clear from the description that the invention is not limited to these illustrated embodiments. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims. Therefore the present description should be seen as illustrative and not limiting.

Figure 1:
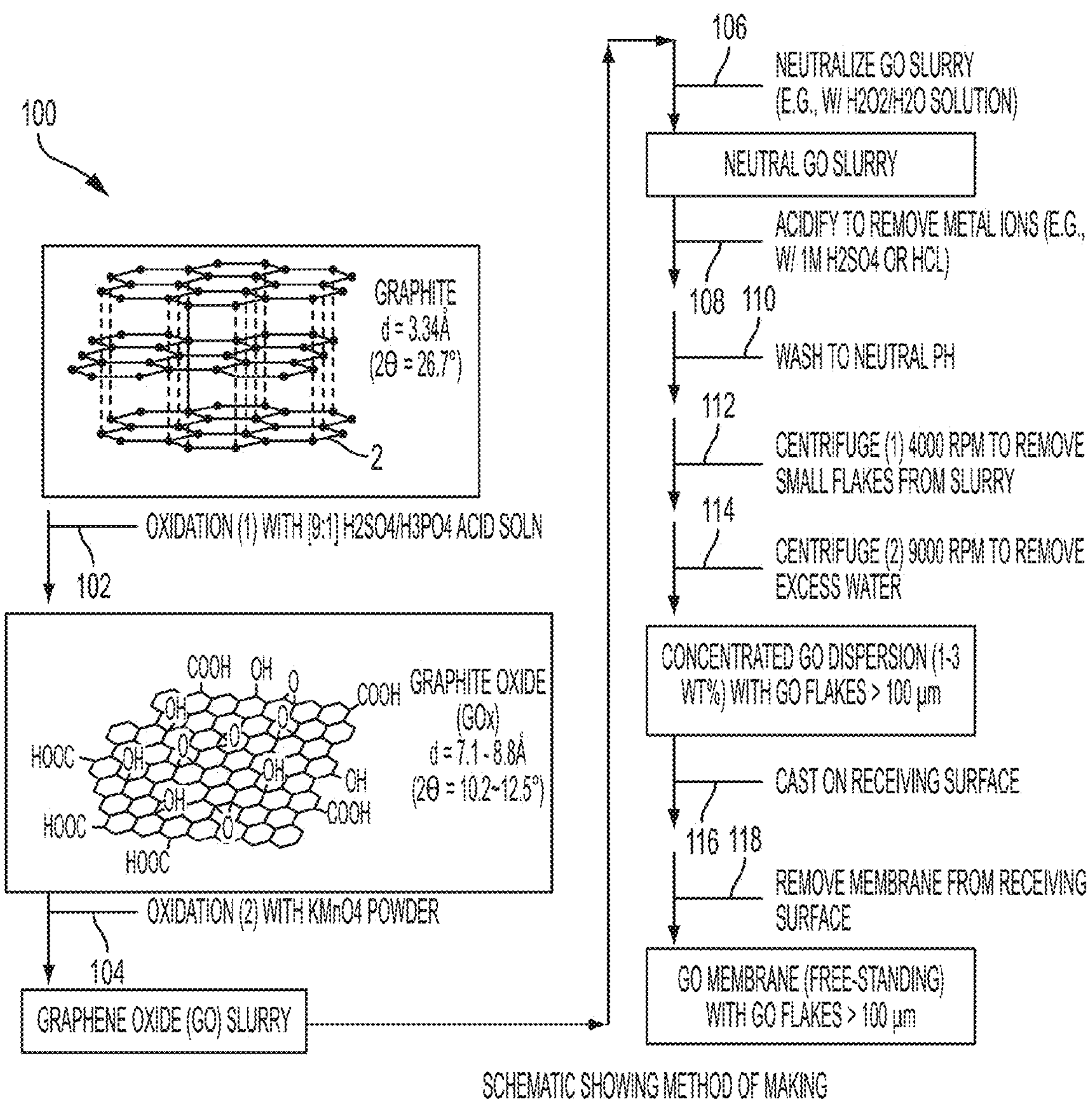
FIG. 1 presents an exemplary method for making graphene oxide membranes in accordance with the present invention.

FIGS. 1-7 show various examples of the present invention. Referring first to FIG. 1 a first embodiment of the present invention is described. In this embodiment an aqueous gel dispersion (1-3 wt %) of graphene oxide (GO) flakes having an average diameter greater than 100 micrometers is cast onto a receiving surface at a substantially neutral pH (preferably between a pH between 5-7.5) to form a GO membrane thereon of a selected thickness. (Preferably the selected thickness is between about 2 micrometers to about 10 micrometers, and can be applied using a draw bar.) This dispersion is then allowed to air dry and then disengaged from the receiving surface to form a free-standing graphene oxide membrane with various capabilities and advantages that are not available in the existing devices.

In one embodiment and example the aqueous gel dispersion is made by introducing a graphite solid with a particle size greater than about 150 micrometers to an acid solution comprising a 9:1 ratio of concentrated sulfuric acid and concentrated phosphoric acid without sonicating or stirring the graphite therein to form a slurry of solid graphite oxide. Preferably the graphite remains in the acid solution for a period between 8-9 minutes to form an initial quantity of graphite oxide in a slurry. This initially formed graphite oxide in the slurry is then treated to a second oxidation step by adding excess $KMnO_4$ powder thereto to fully oxidize the graphite oxide therein and yield individual layers of graphene oxide. These individual layers of graphene oxide are then oxidized by adding the slurry to a 30 wt % $H_2O_2/H_2O$ solution at a temperature selected from about 0° C. to about 4° C. to neutralize residual $KMnO_4$ therein. The slurry is then washed with 1M $H_2SO_4$ or HCl without stirring or rotating the GO therein to remove reduced metal therein as metal ions therefrom. The slurry is then iteratively rinsed with water to obtain a substantial neutral pH (5-7.5) therein and to remove GO flakes with a diameter <5 micrometers therefrom. In some embodiments the graphene oxide is further concentrated by centrifugation to form a graphene oxide dispersion comprising graphene oxide GO flakes of a diameter ≥5 micrometers and having an average diameter of at least 100 micrometers at a concentration of GO flakes therein of from 1% to about 3% by weight. FIGS. 2-7 show various configurations of the present invention and various features and aspects thereof. A more detailed description of the invention follows:

FIG. 1 shows an exemplary method 100 for making enhanced graphene oxide membranes in accordance with the present invention. The method includes preparing a concentrated GO dispersion. In a first exemplary step {102}, a graphite solid 2 with a particle size greater than about 150 micrometers is added to an acid solution containing concentrated sulfuric acid and concentrated phosphoric acid in a [9:1] ratio to form a slurry. The graphite is not sonicated or stirred and is allowed to oxidize.

Oxidation of the graphite forms solid graphite oxide that is characterized by the formation of various oxygen-containing functional groups at the exposed surfaces of the graphite solid (e.g., as illustrated) including, but not limited to, for example, ethers (—O—); hydroxyls (—OH); carboxyls (—COOH); and combinations thereof. In another exemplary step {104}, an excess quantity of solid $KMnO_4$ is added (e.g., as a powder) to further oxidize the graphite oxide in the graphite oxide slurry. The slurry containing the KMnO4 powder is intermittently agitated without sonication or stirring of the slurry. The vigorous reaction between the graphite oxide and $KMnO_4$ in the slurry begins to separate (e.g., exfoliate) the stacked layers of graphite oxide which are subsequently oxidized yielding individual layers of graphene oxide (GO). In another exemplary step {106}, the fully oxidized GO slurry is added to a solution (e.g., ~30 wt %) of hydrogen peroxide ($H_2O_2$) in water ($H_2O$) at a low temperature preferably selected from about 0° C. to about 4° C. to neutralize any remaining KMnO4 present in the slurry, yielding a neutral GO slurry. In another exemplary step {108}, after cooling, the slurry is acidified with (~1 L) 1M sulfuric acid ($H_2SO_4$) or 1M hydrochloric acid (HCl) to remove metals by dissolution from the slurry as metal ions. This step is performed without stirring or rotating the GO to minimize degradation of the flakes in the slurry. In another exemplary step {110}, the GO in the acidified slurry is iteratively washed with DI water ($H_2O$) (~3-4 times) until the slurry medium has a substantially neutral pH selected between a pH of at least about 6 and a pH of about 7.5, which removes all of the metal ions from the slurry. As the pH of the slurry medium increases, the color of the GO in the slurry medium progresses from a dark black (pH<3) to a pale amber or translucent color (pH>3 to pH=7.5).

In another exemplary step {112}, the GO slurry now at a substantially neutral pH is centrifuged at a relatively low rotation speed (e.g., 4000 rpm) for a short time (8-9 minutes on average) to remove GO flakes of a diameter below 5 micrometers from the slurry medium that are not desired and to disperse the remaining large GO flakes in the liquid medium yielding a dilute GO dispersion. In another exemplary step {114}, the dilute GO dispersion now free of small GO flakes is centrifuged at a relatively high rotation speed (e.g., 9000 rpm) for a longer time (90 minutes-120 minutes on average) to remove excess water from the GO layers yielding a concentrated dispersion (1 wt % to 3 wt % GO in water). In another exemplary step {116}, the concentrated GO dispersion is cast or delivered onto a hydrophobic receiving surface such as a PTFE coated plate at a selected thickness. Thickness may be controlled, for example, with a draw-down rod, or other suitable casting method known those of ordinary skill in the coating or film production arts. The casting step can include drying the newly cast membrane in air to remove residual water present in the membrane. In another exemplary step {118}, the dried GO membrane may be removed (e.g., by peeling or stripping) from the receiving surface yielding a free-standing, robust GO membrane with enhanced permeability and selectivity properties suitable for various dehumidification applications detailed further herein.

Figure 2A:
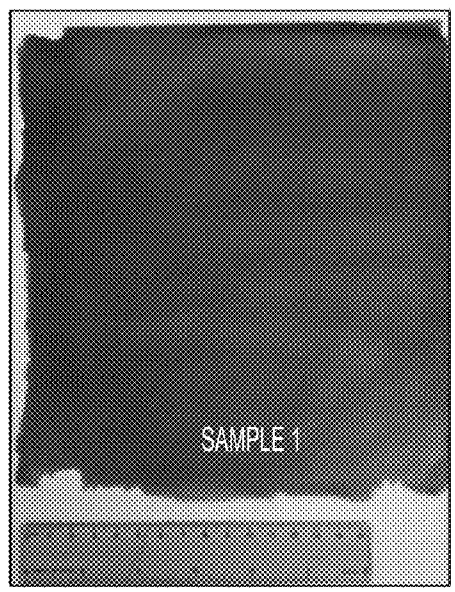
FIGS. 2A-2D are photographic images showing exemplary GO membranes of the present invention with respective thicknesses.
Figure 2B:
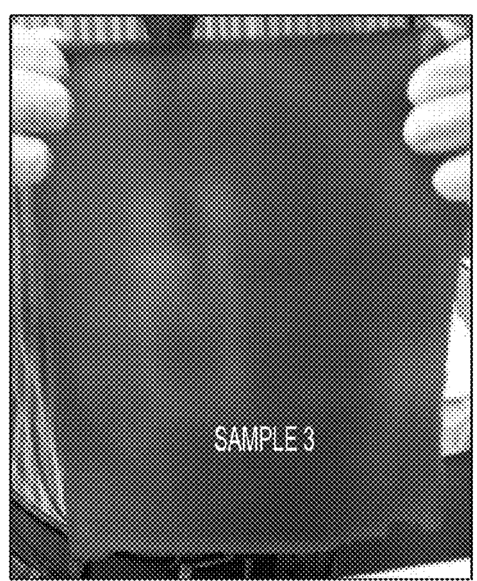
Figure 2C:
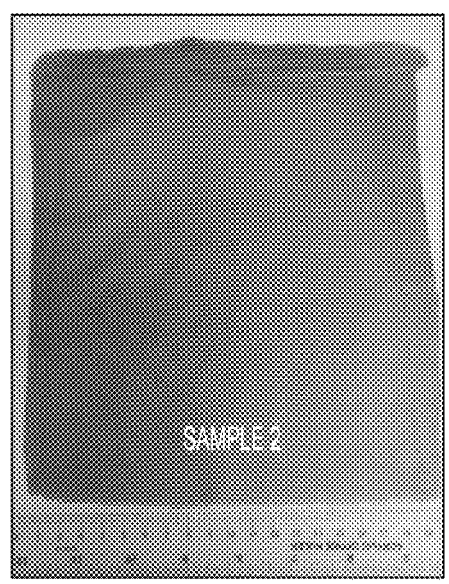
Figure 2D:
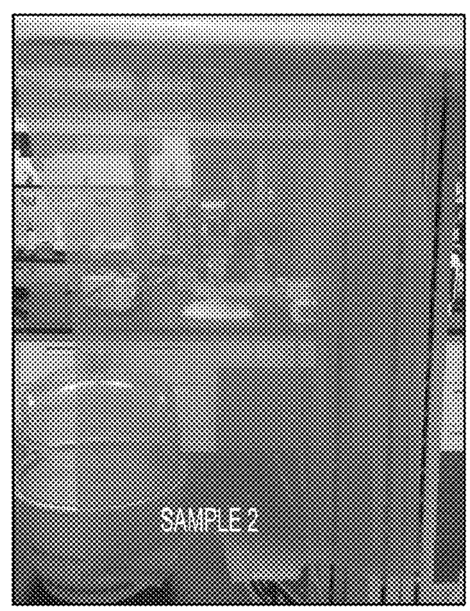

FIGS. 2A-2D are photographic images showing exemplary GO membranes produced in accordance with the present invention. As shown in the figures, membranes are light brown, which contrasts with conventional GO membranes which are black (not shown). GO membranes of the present invention have thicknesses that are scalable, and therefore not limited. Selection of membrane thickness is at least in part a function of the desired permeability and selectivity properties for the membrane in operation. These values are inversely proportional to the thickness, meaning that the membrane performs better at lower thicknesses, on average as detailed further herein. However, no limitations are intended. In some embodiments, GO membranes have thicknesses of at least about 1 micrometer. FIG. 2D shows an exemplary free-standing GO membrane with a thickness of 1 micrometer that is translucent, yet retains its structural integrity. In some embodiments, GO membranes have thicknesses selected from about 1 micrometer to about 30 micrometers.

FIG. 3 is a table (TABLE 1) directly comparing physical properties of exemplary GO membranes of the present invention (bold) against conventional GO membranes prepared via conventional vacuum filtration. Results show that membranes of the present invention [samples 1-3] include a significantly larger flake diameter [e.g., 2λ (20 micrometers) to 10λ (100 micrometers) or greater] compared to the conventional membranes. And, carbon-to-oxygen (C:O) ratios show that oxygen content for the invention membranes is higher, which directly increases the stability of the membranes.

Figure 4:
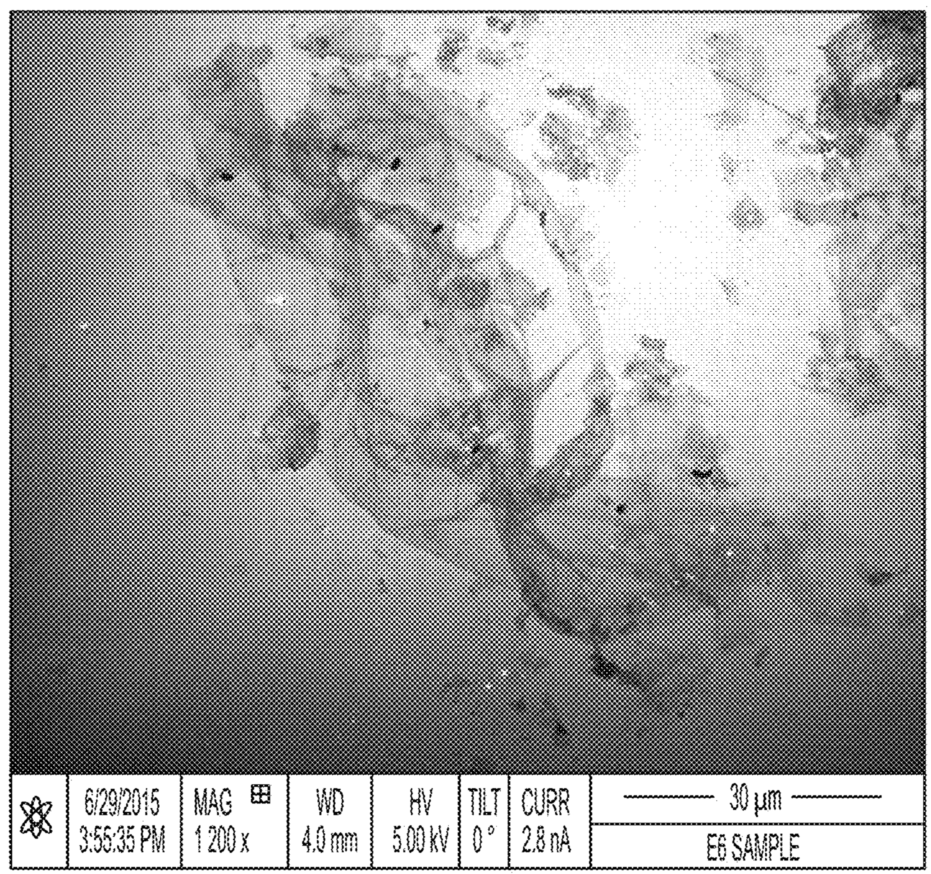
FIG. 4 is an SEM image of a GO dispersion prior to removing small GO flakes that shows presence of large GO flakes used to prepare GO membranes in accordance with the present invention.

FIG. 4 is an SEM image showing a typical GO dispersion of the present invention described previously in reference to FIG. 1. The SEM image was collected prior to a first centrifugation step (step 112, FIG. 1) that removes small (<5 micrometers) GO flakes from the GO dispersion medium. The SEM clearly shows presence of large GO flakes (>100 micrometers) in the GO dispersion that form GO membranes in accordance with the present invention.

Figure 5:
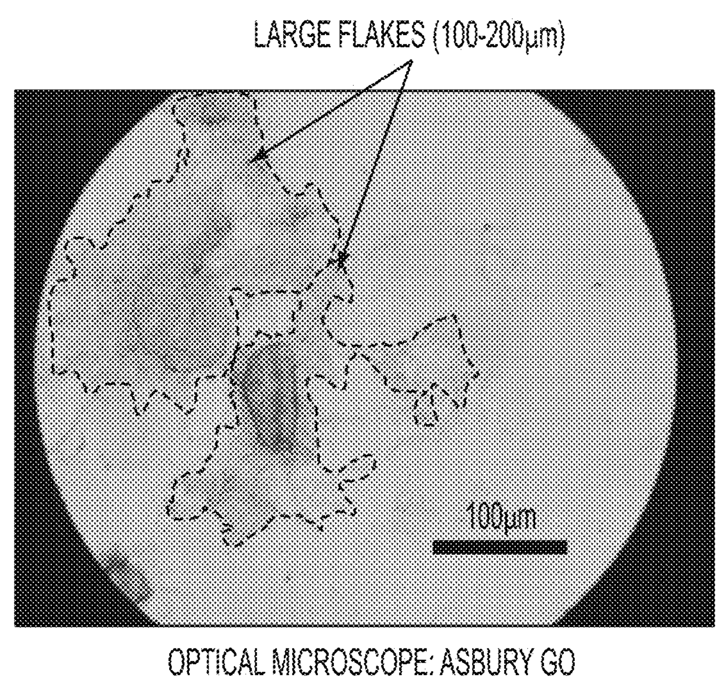
FIG. 5 is an optical microscope image of a concentrated GO dispersion showing presence of large GO flakes after removal of small flakes used to prepare GO membranes in accordance with the present invention.

FIG. 5 is an optical microscope image of the concentrated GO dispersion obtained after a second centrifugation step (step 114, FIG. 1) showing presence of large GO flakes used to form GO membranes in accordance with the present invention.

Figure 6B:
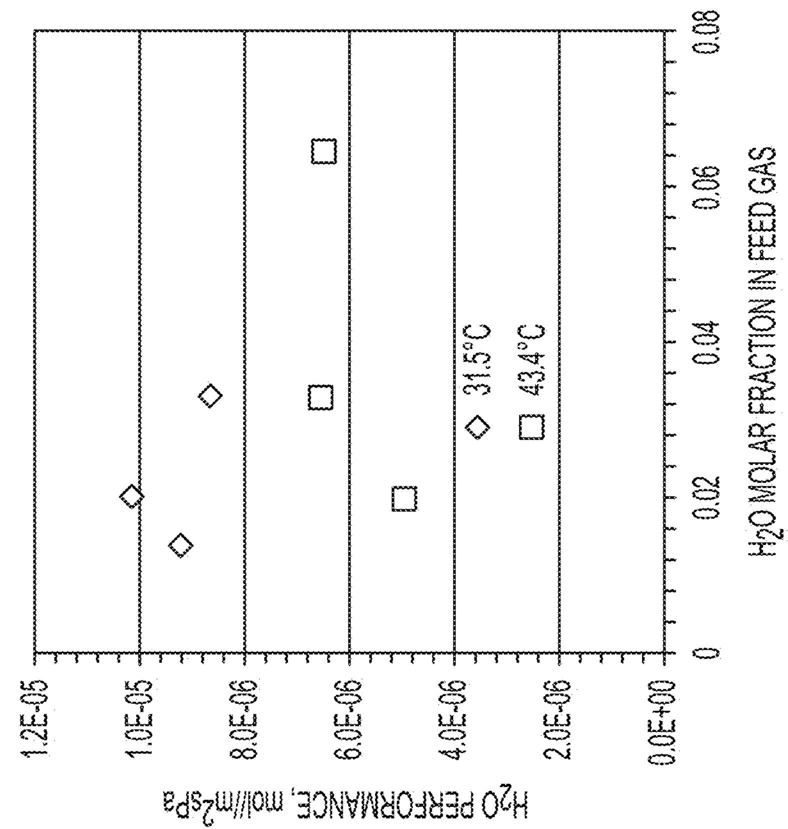
FIGS. 6A-6B plot variation of (a) water flux through GO membranes as a function of test cell temperature and different mole fractions of water vapor, and (b) water vapor permeance of GO membranes as a function of water mole fraction in feed gas at different operating cell temperatures.
Figure 6A:
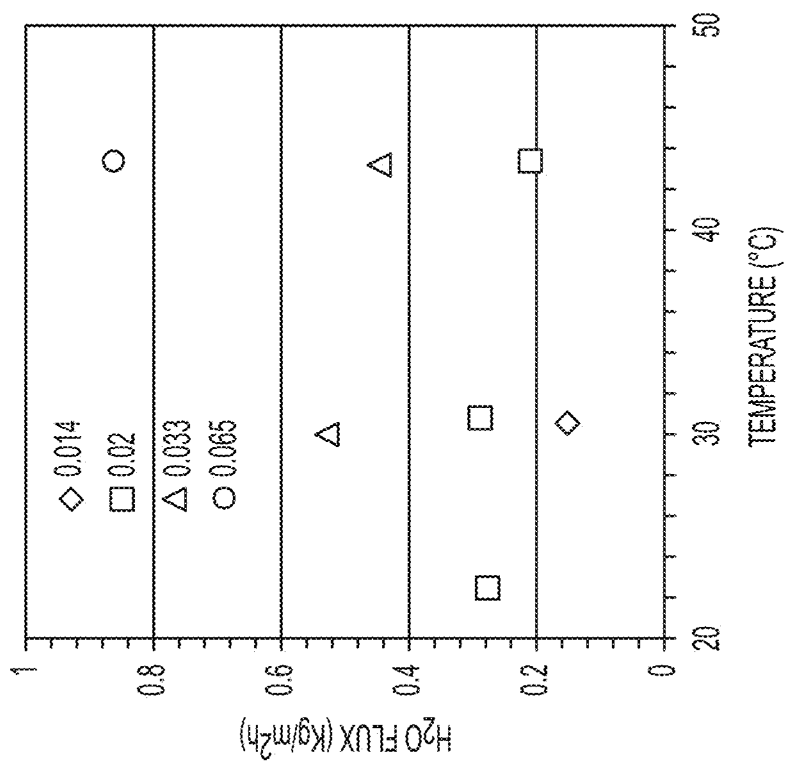

FIGS. 6A-6B plots the variation of (a) water flux through GO membranes as a function of test cell temperature and different mole fractions of water vapor, and (b) water vapor permeance of GO membranes as a function of water mole fraction in feed gas at different operating cell temperatures. FIG. 7 shows a table (TABLE 2) that compares selectivity and permeation results for exemplary GO membranes of the present invention against conventional GO membranes. Membranes of the present invention (samples 1 and 3) have $H_2O$ permeance (i.e., thickness independent) values that are similar to the conventional membranes. However, at an equivalent thickness, permeability (thickness dependent) values calculated for the conventional membranes show membranes of the present invention have a water vapor permeability (see TABLE 3) at least about 10λ better than conventional membranes. The conventional membranes with small (<5 micrometers) GO flakes have a reduced ability to separate water compared to those of the present invention.

FIG. 8 shows a table (TABLE 3) that compares permeability results for exemplary GO membranes of the present invention against various conventional membrane materials used for air dehumidification. Results show the GO membranes have a better permeance value in operation compared with other membranes.

GO membranes of the present invention with flakes of an enhanced diameter find use in industrial applications that require superior water vapor permeability up to $10^{-5}$ mol/$m^2 \cdot s \cdot Pa$ and selectivity versus $N_2$ gas above about $10^4$. The GO membranes of the present invention find application in, for example, dehumidification, mass-transfer, mass-exchange, heat-exchange, filtration, and molecular separation applications.

GO membranes of the present invention exhibit a number of advantages over conventional GO membranes known in the art. First, the method of the present invention employs graphite as a raw material significantly lowering the cost of fabrication of GO membranes. In addition, the casting process easily selects resulting thickness of the GO membranes. Second, GO membranes and GO flake diameter are scalable for use in varied applications. Third, water flux through the GO membranes is dominant over other gases including $CO_2$, $O_2$, $N_2$, and Ar. Fourth, functionalization of the membrane surface is not required, as GO surfaces already contain hydrophilic functionalities including carboxylate, hydroxyl, and epoxide groups. In addition, GO dispersions prepared in concert with the present invention have several advantages over conventional GO dispersions known in the conventional art. First, all oxidation processes are conducted at room temperature. Second, reaction mixtures are not stirred during the oxidation process maintaining the original graphite particle size. Third, GO membranes prepared from these dispersion gels contain significantly larger diameter GO flakes. And, the membranes take less time to form than those prepared by conventional vacuum filtration of dilute GO dispersions known in the conventional art. Fourth, GO membranes of the present invention have a thickness from about 2 micrometers to about 30 micrometers, are transparent, are mechanically strong, and have superior water permeation and water selectivity.

The following examples provide a further understanding of various aspects of the present invention. In one example an acid mixture of concentrated $H_2SO_4$ [9] (sulfuric acid)+ concentrated H3PO4 [1] (phosphoric acid) is mixed in a [9:1] ratio (~300 mL). Cool. Then add 5 g graphite (e.g., ~500 micrometer particle size) to form an oxidized form of stable black graphite (floating) 300 mL of oxidation solution. This mixture is not sonicated or stirred. 25 g of solid (fine powder) $KMnO_4$ is added to the mixture dissolution (~1 hr) to oxidize the graphite. While there is no stirring, the mixture may be agitated with a TEFLON® rod to form a reaction mixture that becomes a thick slurry. This reacts immediately with graphite because of oxidation. As this reacts, temperature of the slurry rises typically to 40° C.-50° C. In one example the material is cooled with an ice bath. In other examples, the material is cooled at room temperature (typically about 6 hours). A thick slurry of graphene oxide is produced wherein the oxidation from the reaction produces spaces in the layers that can be separated to form individual layers. This slurry is then added to cold (0° C.-4° C.)<1.0 M $H_2O_2$ solution to form a $H_2O_2$/water mixture and cooled overnight. The $H_2O_2$ provides additional oxidation of the graphene oxide (GO) that forms sheets. The slurry is then washed with an acid (1M $H_2SO_4$ or HCl in this case) to remove metal ions from the slurry, and washed again with $H_2O$ until neutral (pH ~6). A centrifuge is then used to separate the materials. When centrifuged the graphene sheets float to the top. At 4000 rpm (8-10 minutes) and a pH above 3, GO is observed at the top of the graphite oxide in the form of yellow or orange layers (translucent or light). Unreacted graphite remains at the bottom. Centrifugation at 9000 rpm (90 minutes-120 minutes) takes the pH to 5 or above. Centrifugation can also be used to remove some water to concentrate (<0.5 wt % to 1 wt %) the graphene oxide.

The slurry is cast on a PTFE coated surface or plate (hydrophobic) to form a membrane. The thickness can be controlled by drawing down the thickness with a rod. The slurry is then left to air dry which results in a free-standing membrane that is stable. In some instances the membrane is nearly transparent, which can be seen through. The typical time for this entire process is about 1.5-2.5 days.

Graphene oxide membranes prepared as described above were tested to assess permeability. Membranes were held against a porous metal frit and sealed with silicone O-rings. A first test gas was comprised of air without any water present (i.e., highly purified atmosphere with 0% water) to establish a baseline. A second test gas prepared using a water bubbler contained humidified air with a nominal 50% relative humidity. Test gases were flowed on a first side of the membrane and a sweep gas (He) was flowed on a second side of the membrane to carry the permeate (e.g., water transported through the membrane) to a quadrupole mass spectrometer used as a residual gas analyzer (RGA) that measured partial pressures at each mass. The mass spectrometer analyzer included a resolution of 0.1 AMU up to 100 AMU. Permeate was collected for a weight measurement. Gases on both sides of the test cell were vented to atmosphere so that the change in pressure ($\Delta P$) across the membranes was a net zero such that driving force through the membranes was due strictly to relative partial pressure of the permeate gases. Results are shown in FIG. 6 and FIG. 7, respectively.

Permeability tests on membranes of the present invention were evaluated for ability to dehumidify (i.e., remove water) from a mixed gas including, for example, $H_2O$, $O_2$, $N_2$, and $CO_2$. Free-standing GO membranes showed a surprisingly high water vapor permeability of up to $1.0\times10^{-5}$ mol/m$^2$ s·Pa. Permeability of $N_2$ (and $O_2$, $CO_2$) through the membrane was below the system detection limit, correlating with a selectivity for water above $10^4$ at a relative humidity (RH) of 80% air at a temperature of 30.8° C.

While various preferred embodiments of the invention are shown and described, it is to be distinctly understood that this invention is not limited thereto but may be variously embodied to practice within the scope of the following claims.

What is claimed is:

1. A method for making a graphene oxide membrane, comprising the step of:

casting a gel dispersion comprising graphene oxide (GO) flakes having an average diameter greater than or equal to about 100 micrometers at a substantially neutral pH onto a receiving surface.

2. The method of claim 1, further including the step of air drying the gel dispersion on the receiving surface to form the membrane.

3. The method of claim 1, wherein the gel dispersion includes a pH selected from about 5 to about 7.5.

4. The method of claim 1, wherein the graphene oxide (GO) flakes in the gel has a concentration between about 1% to about 3% by weight.

5. The method of claim 1, wherein the gel dispersion is formed by a process including placing a graphite solid with a particle size greater than about 150 micrometers into a concentrated acid solution without sonicating or stirring the graphite for a time sufficient to form a quantity of graphite oxide.

6. The method of claim 5, further comprising the step of adding $KMnO_4$ powder to the concentrated acid solution to form individual layers of graphene oxide (GO) therein.

7. The method of claim 6, further comprising the step of adding the individual layers of graphene oxide (GO) to a $H_2O_2/H_2O$ solution to neutralize unreacted $KMnO_4$.

8. The method of claim 7, further including washing the individual layers of graphene oxide (GO) in the neutral solution without stirring or rotating the GO and acidifying the neutral solution to remove reduced metal as metal ions therefrom.

9. The method of claim 8, further including iteratively rinsing and centrifuging the individual layers of graphene oxide (GO) in the previously acidified solution with distilled $H_2O$ to obtain a solution with a pH between about 5 and about 7.5 and removing GO flakes of a diameter less than about 5 micrometers therefrom.

10. The method of claim 1, further comprising using a draw-bar to draw the dispersion down to the selected thickness.

* * * * *